(12) United States Patent
Xie et al.

(10) Patent No.: US 12,280,389 B2
(45) Date of Patent: Apr. 22, 2025

(54) MICROBUBBLE-PRODUCING WATER OUTLET ASSEMBLY

(71) Applicant: Purity (Xiamen) Sanitary Ware Co., LTD, Xiamen (CN)

(72) Inventors: Pawel Xie, Xiamen (CN); Kaiqing Xie, Xiamen (CN)

(73) Assignee: Purity (Xiamen) Sanitary Ware Co., LTD, Xiamen (CN)

( * ) Notice: Subject to any disclaimer, the term of this patent is extended or adjusted under 35 U.S.C. 154(b) by 469 days.

(21) Appl. No.: 17/900,881

(22) Filed: Sep. 1, 2022

(65) Prior Publication Data
US 2022/0410190 A1 Dec. 29, 2022

(30) Foreign Application Priority Data

Jan. 12, 2022 (CN) .......................... 202220070229.2

(51) Int. Cl.
| | | |
|---|---|---|
| *B01F 23/23* | (2022.01) | |
| *B01F 23/231* | (2022.01) | |
| *B01F 23/2373* | (2022.01) | |
| *B05B 1/18* | (2006.01) | |
| *B05B 7/00* | (2006.01) | |
| *B01F 101/48* | (2022.01) | |

(52) U.S. Cl.
CPC ............ *B05B 7/0081* (2013.01); *B01F 23/23* (2022.01); *B01F 23/231* (2022.01); *B01F 23/2373* (2022.01); *B05B 1/185* (2013.01); *B01F 2101/48* (2022.01)

(58) Field of Classification Search
CPC ............................. B01F 23/23; B01F 23/231
See application file for complete search history.

(56) References Cited

U.S. PATENT DOCUMENTS

| | | |
|---|---|---|
| 2019/0234680 A1 | 8/2019 | Shou et al. |
| 2020/0338576 A1 | 10/2020 | Zhang et al. |
| 2021/0222410 A1 | 7/2021 | Wu et al. |

FOREIGN PATENT DOCUMENTS

| | | | |
|---|---|---|---|
| CN | 215166173 U | * | 12/2021 |
| CN | 217614067 U | * | 10/2022 |

* cited by examiner

*Primary Examiner* — Robert A Hopkins
(74) *Attorney, Agent, or Firm* — Jose Cherson Weissbrot

(57) ABSTRACT

The present invention discloses a microbubble-producing water outlet assembly, which includes a housing, a water inflow component, a water through-flow disc and at least three layers of bubble mesh plates. The microbubble-producing water outlet assembly provided by the present invention has a simple structure, is easy to manufacture and easy to implement, has a low cost, and solves a problem that the water flow strength is too high but the content of microbubbles is too low in existing water outlet assemblies in the prior art.

9 Claims, 3 Drawing Sheets

MICROBUBBLE-PRODUCING WATER OUTLET ASSEMBLY

TECHNICAL FIELD

The present invention relates to the field of bathroom accessories, in particular to a microbubble-producing water outlet assembly.

BACKGROUND ART

At present, the water outflow components of the existing showers, faucets and other products directly jet water, and utilize various complex function switching structures to form various water jetting patterns. As the requirements for health and water quality are increased gradually, the demand for the washing ability and the oxygen content in water is increased greatly. Therefore, researchers and developers have designed microbubble-producing faucets or showers. A microbubble-producing faucet or shower entrains air in the water outflow process so as to increase the oxygen content in the water flow. The bubbles produced by the entrained air can be used to clean vegetables, melons and fruits; the bubbles break after the water is sprayed to human body, thereby achieve a better cleaning and massage effect. However, existing microbubble-producing faucets or showers still have the following drawbacks: (1) with existing air entraining structures, the water flow reaches the water outlet before the air can be entrained into the water flow extensively owing to the high water flow speed; therefore, the content of entrained air in the water flow is low, the quantity of microbubbles is not enough, and the microbubbles are dispersed rapidly, can't achieve a satisfactory cleaning effect; (2) the fixing structure of existing microbubble-producing bubble mesh plates are too complex, resulting an over-sized water outflow component; in addition, the mesh plates may be displaced or deformed easily under the action of the water flow and have a short service life.

In summary, there is an urgent need for a water outlet assembly that solves the above problems to meet the market demand.

CONTENTS OF THE INVENTION

To overcome the above-mentioned drawbacks or problems in the prior art, the present invention provides a microbubble-producing water outlet assembly, which has a simple structure, is easy to manufacture and easy to implement, has a low cost, and solves a problem that the water flow strength is too high but the content of microbubbles is too low in existing water outlet assemblies in the prior art.

To attain the object described above, the present invention provides the following technical schemes:

A microbubble-producing water outlet assembly, comprising a housing, a water inflow component, a water through-flow disc, and at least three layers of bubble mesh plates, wherein the housing is provided with a water outflow hole, and the housing is fitted with the water inflow component to form an accommodating space for mounting the water through-flow disc and the bubble mesh plates;

the water inflow component is provided with a plurality of water inflow holes;

the water through-flow disc comprises a plurality of water through-flow holes and a plurality of air intake passages; the water through-flow holes are arranged opposite to the water inflow holes, and have an aperture greater than that of the water inflow holes; the plurality of water through-flow holes are in communication with at least two air intake passages respectively and correspondingly, and the air streams in the two air intake passages meet, collide or mix with each other and then enter the water through-flow holes;

the bubble mesh plates are arranged at an interval in the water outflow direction respectively, and a water mixing cavity is formed between the bubble mesh plates and the water through-flow disc;

wherein, water flows into the water through-flow holes from the water inflow holes, is mixed with the merged air, and is dispersed through the bubble mesh plates sequentially, and then flows out of the water outflow hole of the housing.

Furthermore, the plurality of water inflow holes in the water inflow component have a funnel-shaped longitudinal section respectively, and the funnel-shaped water inflow holes are arranged in a gradually tapered form in the water outflow direction.

Furthermore, the two air intake passages are arranged at an included angle with respect to each other and meet each other at the water inflow position of the corresponding water through-flow hole.

Furthermore, the water inflow holes and the water through-flow holes are arranged annularly at an interval in the water inflow component and the water through-flow disc respectively, and gradually tapered and offset inward in parallel from the circumference of the water inflow component and the water through-flow disc respectively, to form a plurality of annular groups of water inflow holes and a plurality of annular groups of water through-flow holes.

Furthermore, the water through-flow disc is further provided with air distribution passages for introducing air into the water through-flow holes in the inner annular groups of water through-flow holes, and the air distribution passages are located between adjacent two air intake passages.

Furthermore, the plurality of bubble mesh plates comprise an integrally formed mesh part and assembling part, wherein a plurality of meshes for the water mixed with air to pass through are evenly distributed on the mesh part; and the assembling part is arranged annularly on the circumference of the mesh part, and two adjacent bubble mesh plates abut against or are nested with each other via the assembling part to adjust the spacing between two adjacent bubble mesh plates.

Furthermore, the spacing between two adjacent bubble mesh plates is 0.5-2 mm.

Furthermore, the meshes of at least two bubble mesh plates are in size of 100-200 meshes per inch (mpi).

Furthermore, the microbubble-producing water outlet assembly further comprises a water outflow plate that is mounted in the housing and in communication with the bubble mesh plates; water through-flow passages are evenly distributed on the water outflow plate, and the aperture of the water through-flow passages is greater than the aperture of the meshes of the mesh part.

It is seen from the above description of the present invention: the present invention has the following beneficial effects when compared with the prior art:

(a) The present invention provides a microbubble-producing water outlet assembly, which has a simple structure, is easy to manufacture and easy to implement, has a low cost, and solves a problem that the water flow strength is too high but the content of microbubbles is too low in existing water outlet assemblies in the prior art. In the present invention, the aperture difference between the water inflow holes and the water through-flow holes is utilized to create a strong negative pressure when the water is jetted into the water through-flow holes, so that the air in the air intake passages are sucked into the water through-flow holes. In that process, the air streams in the two air intake passages meet, collide or mix with each other, so that the air become mild before it enters the water flow, thereby the increase of water flow speed incurred by air pressurization is avoided effectively, while the air-water mixing duration is increased; thus, the air is entrained into the water flow extensively, and there is enough entrained air in the water flow when the water flows into the water mixing cavity; in addition, the water flow speed is decreased in the water mixing cavity, and big air bubbles in the water flow are fully broken into numerous microbubbles after the water flows through at least three layers of bubble mesh plates. Then, the microbubble-containing water flow can be used to wash vegetables, melons and fruits, or can be used for bath; thus, foreign matters can be removed effectively by means of microbubble breaking, and a better massage effect can be achieved as the microbubbles break on human body. The microbubble-producing water outlet assembly provided by the present invention has a simple overall structure, doesn't require any linkage or auxiliary structure, has a low cost, produces a large amount of microbubbles, and can meet the user' demand easily.

(b) The water inflow holes of the water inflow component in the present invention are funnel-shaped and gradually tapered, so that the water flows through the water inflow holes in a direction from a greater aperture to a smaller aperture, thereby the water flow speed is increased, and a better negative pressure effect is attained when the water is jetted into the water through-flow holes at the smaller-aperture water outflow position.

(c) The two air intake passages in the present invention are arranged at an included angle with respect to each other, so that the air collision is milder, and the air volume is more sufficient.

(d) The air distribution passages on the water through-flow disc in the present invention effectively attains an effect of sucking enough air into the internal water outlet, and the overall layout of the air distribution passages is reasonable, so that the air is sucked into the water flow mildly while sufficient air volume is maintained.

(e) The bubble mesh plates in the present invention are integrally formed, and the spacing between the bubble mesh plates is adjusted by stacking and nesting while the strength and stability of the bubble mesh plates are ensured.

(f) Bubble mesh plates with meshes in size of 100-200 mpi are used in the present invention to produce microbubbles in a better way and produce more microbubbles.

BRIEF DESCRIPTION OF DRAWINGS

To explain the technical scheme in the embodiments of the present invention more clearly, hereunder the drawings to be used in the description of the embodiments will be introduced briefly. Apparently, the drawings used in the description below only illustrate some embodiments of the present invention, and those having ordinary skills in the art can work out other drawings based on these drawings without expending any creative labor.

EMBODIMENTS

Hereunder the technical scheme in the embodiments of the present invention will be described clearly and fully with reference to the accompanying drawings used in the embodiments of the present invention. Apparently, the described embodiments are only some preferred embodiments of the present invention, and should not be deemed as excluding other embodiments. Those having ordinary skills in the art can obtain other embodiments on the basis of the embodiments provided herein without expending any creative labor; however, all of those embodiments shall be deemed as falling in the scope of protection of the present invention.

Unless otherwise specified, the terms "first", "second" and "third", etc. as used in the claims, specifications and the above drawings of the present invention are intended to differentiate different objects rather than to describe a specific sequence.

Unless otherwise specified, orientational terms that indicate orientational or positional relationships, such as "central", "transverse", "longitudinal", "horizontal", "vertical", "top", "bottom", "inside", "outside", "up", "down", "front", "back", "left", "right", "clockwise", and "counter-clockwise", etc., as used in the claims, specifications and the above drawings of the present invention, are based on the orientational or positional relationships indicated in the accompanying drawings, and are only for the convenience of describing the present invention and simplifying the description, rather than indicating or implying that the referred device or element must have a specific orientation or be constructed and operated in a specific orientation. Therefore, such orientational terms shall not be understood as limiting the specific scope of protection of the present invention.

Unless otherwise specified, the term "fixed connection" as used in the claims, specifications and the above drawings of the present invention should be understood in a broad sense, i.e., any form of connection without a displacement relationship or relative rotation relationship between the connected objects, which is to say, including non-detachable fixed connection, detachable fixed connection, integral connection and fixed connection via other devices or elements.

The terms "comprise", "include" and "have" and their grammatical variants as used in the claims, specifications and the above drawings of the present invention are intended to mean "including but not limited to".

Figure 1:
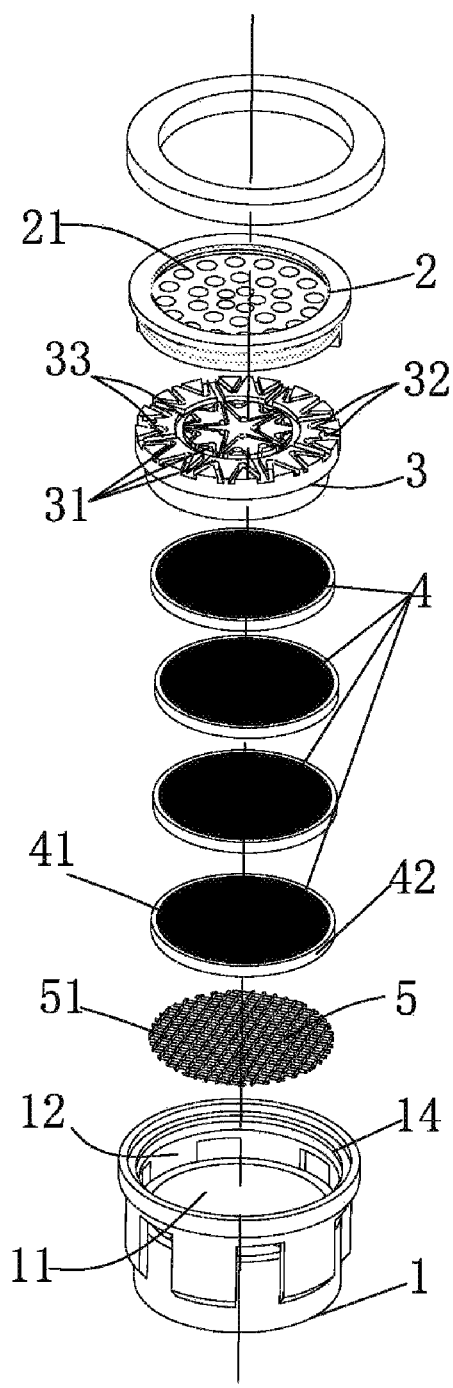
FIG. 1 is a schematic 3D exploded structural diagram of the water outlet assembly in the present invention.
Figure 2:
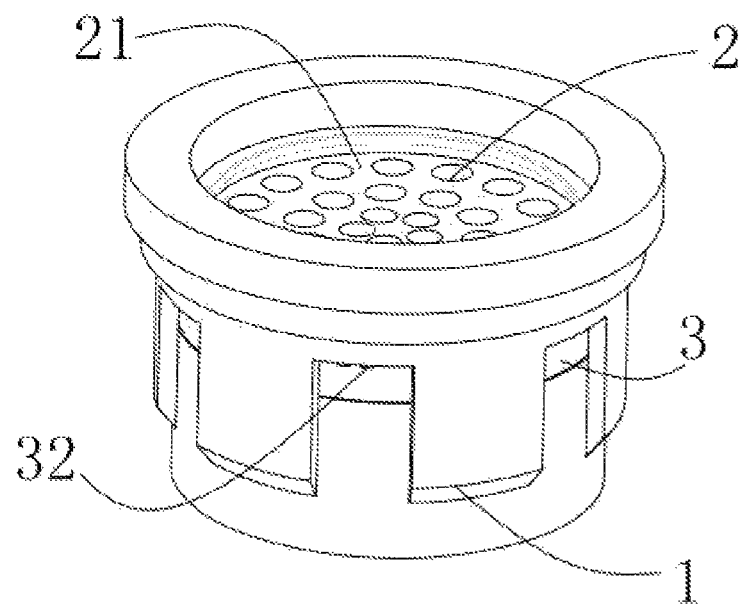
FIG. 2 is a schematic 3D structural diagram of the water outlet assembly in the present invention.
Figure 3:
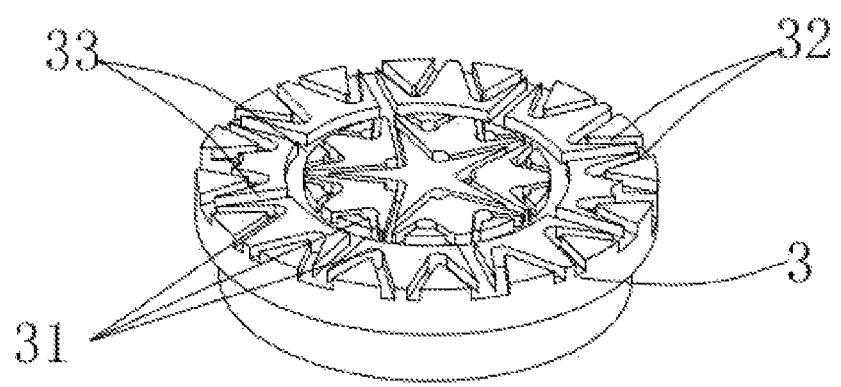
FIG. 3 is a schematic 3D structural diagram of the water through-flow disc in the present invention.
Figure 4:
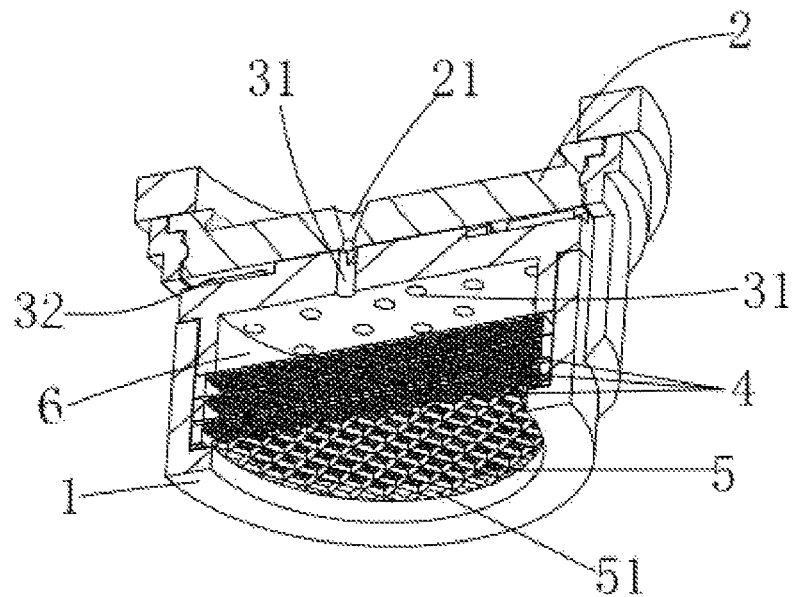
FIG. 4 is a 3D sectional view of the water outlet assembly in the present invention.
Figure 5:
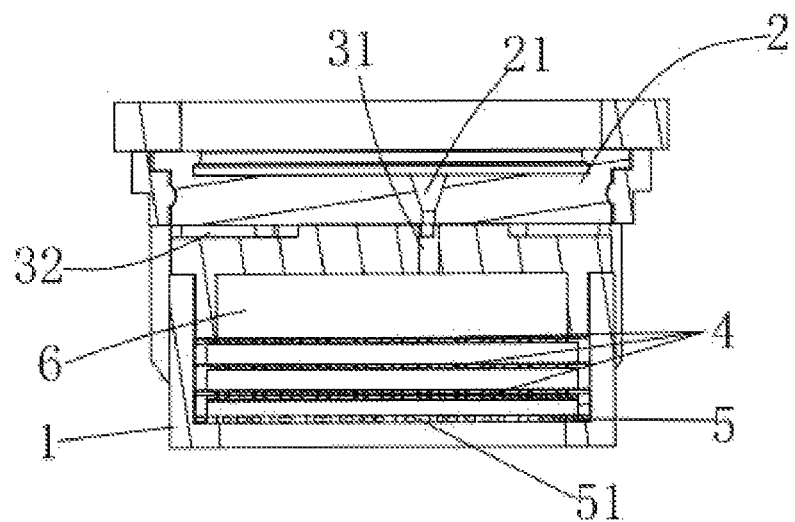
FIG. 5 is a 3D sectional view of the water outlet assembly in the present invention.

Please see FIGS. 1-5. The present invention provides a microbubble-producing water outlet assembly, which comprises a housing 1, a water inflow component 2, a water through-flow disc 3 and at least three layers of bubble mesh plates 4, wherein the housing 1 is provided with a water outflow hole 11, and the housing 1 is fitted with the water inflow component 2 to form an accommodating space 12 for mounting the water through-flow disc 3 and the bubble mesh plates 4;

the water inflow component 2 is provided with a plurality of water inflow holes 21; it should be noted that the plurality of water inflow holes 21 in the water inflow component 2 in the present invention have a funnel-shaped longitudinal section respectively, and the funnel-shaped water inflow holes 21 are arranged in a way that they are gradually tapered in the water outflow direction, so that a better negative pressure effect can be created when the water flow is jetted into a water through-flow hole 31;

the water through-flow disc 3 comprises a plurality of water through-flow holes 31 and a plurality of air intake passages 32;

the water through-flow holes 31 are arranged opposite to the water inflow holes 21, and have an aperture greater than that of the water inflow holes 21;

the plurality of water through-flow holes 31 are in communication with at least two air intake passages 32 respectively and correspondingly, and the air streams in the two air intake passages 32 meet, collide or mix with each other and then enter the water through-flow holes 31; in the present invention, the two air intake passages 32 are arranged at an included angle with respect to each other and meet each other at the water inflow position of the corresponding water through-flow hole 31.

The bubble mesh plates 4 are arranged at an interval in the water outflow direction respectively, and a water mixing cavity 6 is formed between the bubble mesh plates 4 and the water through-flow disc 3; in the present invention, three bubble mesh plates 4 are stacked as an example, and the spacing between every two adjacent bubble mesh plates 4 is 0.5-2 mm, preferably 1.2 mm; in addition, the meshes of at least two bubble mesh plates 4 in the present invention are in size of 100-200 meshes per inch (mpi).

The microbubble-producing water outlet assembly further comprises a water outflow plate 5 that is mounted in the housing 1 and in communication with the bubble mesh plates 4; water through-flow passages 51 are evenly distributed on the water outflow plate 5, and the aperture of the water through-flow passages 51 is greater than the aperture of the meshes of the mesh part 41.

Water flows into the water through-flow holes 31 from the water inflow holes 21, is mixed with the air after the air stream collide with each other, is mixed in the water mixing cavity 6, and then is dispersed through the bubble mesh plates 4 sequentially, and flows out of the water outflow hole 11 of the housing 1.

More particularly, the water inflow holes 21 and the water through-flow holes 31 are arranged annularly at an interval in the water inflow component 2 and the water through-flow disc 3 respectively, and gradually tapered and offset inward in parallel from the circumference of the water inflow component 2 and the water through-flow disc 3 respectively, to form a plurality of annular groups of water inflow holes and a plurality of annular groups of water inflow holes.

More particularly, the water through-flow disc 3 is further provided with air distribution passages 33 for introducing air into the water through-flow holes 31 in the inner annular groups of water through-flow hole, and the air distribution passages 33 are located between adjacent two air intake passages 32.

More particularly, the plurality of bubble mesh plates 4 comprise an integrally formed mesh part 41 and assembling part 42, wherein a plurality of meshes for the water mixed with air to pass through are evenly distributed on the mesh part 41; and the assembling part 42 is arranged annularly on the circumference of the mesh part 41, and two adjacent bubble mesh plates 4 abut against or are nested with each other via the assembling part 42 to adjust the spacing between two adjacent bubble mesh plates 4.

In an embodiment, as shown in FIGS. 1-5, the microbubble-producing water outlet assembly in the present invention mainly comprises the following components: a housing 1, a water inflow component 2, a water through-flow disc 3, three-layers of bubble mesh plates 4, and a water outflow plate 5.

Actual assembling and use:

(a) The housing 1 is annular, with an accommodating space 12 formed therein and a thread part 14 for connecting to the water inflow component 2;

(b) First, the water outflow plate 5 is mounted into the housing 1, near the water outflow hole 11;

(c) Then, the three layers of bubble mesh plates 4 are mounted into the housing 1; it should be noted that the bubble mesh plates 4 comprise a mesh part 41 and an assembling part 42; the assembling part 42 has certain thickness, and in thickness of 1.2-1.5 mm in the present invention; the three layers of bubble mesh plates 4 are stacked or nested, so that the spacing between the mesh parts 41 can be adjusted and are highly stable; more importantly, the structure is simple, and the footprint is small;

(d) The water through-flow disc 3 is mounted into the accommodating space 12 correspondingly, so that a water mixing cavity 6 is formed between the water through-flow disc 3 and the bubble mesh plates 4; in addition, air intake passages 32 and air distribution passages 33, and water through-flow holes 31 for communication between the water inflow holes 21 and the water mixing cavity 6 are arranged on the side of the water through-flow disc 3 facing the water inflow component 2, wherein each of the water through-flow holes 31 is in communication with at least two air intake passages 32 respectively and correspondingly, so that the air streams in the two air intake passages 32 meet, collide or mix with each other and then enter into the water through-flow holes 31; in the present invention, the two air intake passages 32 are arranged at an included angle with respect to each other and meet each other at the water inflow position of the corresponding water through-flow hole 31; it should be noted that the water through-flow holes 31 in the present invention are arranged at an interval in the circumferential direction and gradually tapered toward the center of the water through-flow disc 3, so the internal water through-flow holes 31 introduce air through the air distribution passages 33, which are arranged in a design that enables the air streams in the two air intake passages 32 to meet each other before they enter the water through-flow holes 31;

(e) The water inflow component 2 is provided with a plurality of water inflow holes 21; it should be noted that the inlet diameter of each water inflow hole 21 is greater than the outlet diameter of the water inflow hole 21, and each water inflow hole 21 is tapered in a funnel form, so that the water flow speed is increased at the outlet and the water is jetted into the water through-flow holes 31, thereby negative pressure build-up is enhanced to suck air better;

(f) Finally, the water inflow component 2 is assembled to the housing 1 through a threaded connection, so as to complete the entire assembling process; then the housing 1 is assembled to the main body of a water faucet or a shower.

In use:

The water flow enters the assembly from the water inflow holes 21 of the water inflow component 2, the water flow speed is increased slightly when the water flow passes through the water inflow holes 21 since the water inflow holes 21 are tapered; negative pressure is produced when the water is jetted into the water through-flow holes 31 that have a greater aperture, thereby air can be sucked into the water through-flow holes 31 from the air intake passages 32 and the air distribution passages 33 rapidly. In that process, the air streams in the air intake passages 32 meet and collide with each other and form air masses before the air enters the water flow in the water through-flow holes 31, thereby sufficient time is provided for water-air mixing while sufficient air volume is maintained; then, the water flow with entrained air is mixed intensively again in the water mixing cavity 6; the water flow with sufficient entrained air passes through the mesh parts 41 of the three layers of bubble mesh plates 4 sequentially, so that the big bubbles in the water flow are broken into numerous microbubbles through the layers of bubble mesh plates 4. Finally, the water flows out of the water outflow plate 5 and forms water flow with entrained microbubbles.

The present invention provides a microbubble-producing water outlet assembly, which has a simple structure, is easy to manufacture and easy to implement, has a low cost, and solves a problem that the water flow strength is too high but the content of microbubbles is too low in existing water outlet assemblies in the prior art. In the present invention, the aperture difference between the water inflow holes and the water through-flow holes is utilized to create a strong negative pressure when the water is jetted into the water through-flow holes, so that the air in the air intake passages are sucked into the water through-flow holes. In that process, the air streams in the two air intake passages meet, collide or mix with each other, so that the air become mild before it enters the water flow, thereby the increase of water flow speed incurred by air pressurization is avoided effectively, while the air-water mixing duration is increased; thus, the air is entrained into the water flow extensively, and there is enough entrained air in the water flow when the water flows into the water mixing cavity; in addition, the water flow speed is decreased in the water mixing cavity, and big air bubbles in the water flow are fully broken into numerous microbubbles after the water flows through at least three layers of bubble mesh plates. Then, the microbubble-containing water flow can be used to wash vegetables, melons and fruits, or can be used for bath; thus, foreign matters can be removed effectively by means of microbubble breaking, and a better massage effect can be achieved as the microbubble break on human body. The microbubble-producing water outlet assembly provided by the present invention has a simple overall structure, doesn't require any linkage or auxiliary structure, has a low cost, produces a large amount of microbubbles, and can meet the user' demand easily. The water inflow holes of the water inflow component in the present invention are funnel-shaped and gradually tapered, so that the water flows through the water inflow holes in a direction from a greater aperture to a smaller aperture, thereby the water flow speed is increased, and a better negative pressure effect is attained when the water is jetted into the water through-flow holes at the smaller-aperture water outflow position. The two air intake passages in the present invention are arranged at an included angle with respect to each other, so that the air collision is milder, and the air volume is more sufficient. The air distribution passages on the water through-flow disc in the present invention effectively attains an effect of sucking enough air into the internal water outlet, and the overall layout of the air distribution passages is reasonable, so that the air is sucked into the water flow mildly while sufficient air volume is maintained. The bubble mesh plates in the present invention are integrally formed, and the spacing between the bubble mesh plates is adjusted by stacking and nesting while the strength and stability of the bubble mesh plates are ensured.

The above description and embodiments are intended to explain the scope of protection of the present invention, but they do not constitute any limitation to the scope of the protection of the present invention.

The invention claimed is:

1. A microbubble-producing water outlet assembly, comprising a housing, a water inflow component, a water through-flow disc, and at least three layers of bubble mesh plates, wherein
the housing is provided with a water outflow hole, and the housing is fitted with the water inflow component to form an accommodating space for mounting the water through-flow disc and the bubble mesh plates;
the water inflow component is provided with a plurality of water inflow holes;
the water through-flow disc comprises a plurality of water through-flow holes and a plurality of air intake passages; the water through-flow holes are arranged opposite to the water inflow holes, and have an aperture greater than that of the water inflow holes; the plurality of water through-flow holes are in communication with at least two air intake passages respectively and correspondingly, and the air streams in the at least two air intake passages meet, collide or mix with each other and then enter the water through-flow holes;
the bubble mesh plates are arranged at an interval in the water outflow direction respectively, and a water mixing cavity is formed between the bubble mesh plates and the water through-flow disc;
wherein water flows into the water through-flow holes from the water inflow holes, is mixed with the merged air, and is dispersed through the bubble mesh plates sequentially, and then flows out of the water outflow hole of the housing.

2. The microbubble-producing water outlet assembly of claim 1, wherein the at least two air intake passages are arranged at an included angle with respect to each other and meet each other at the water inflow position of the corresponding water through-flow hole.

3. The microbubble-producing water outlet assembly of claim 2, wherein the water inflow holes and the water through-flow holes are arranged annularly at an interval in the water inflow component and the water through-flow disc respectively, and gradually tapered and offset inward in parallel from the circumference of the water inflow component and the water through-flow disc respectively, to form a plurality of annular groups of water inflow holes and a plurality of annular groups of water through-flow holes.

4. The microbubble-producing water outlet assembly of claim 3, wherein the water through-flow disc is further provided with air distribution passages for introducing air into the water through-flow holes in the inner annular groups of water through-flow holes, and the air distribution passages are located between adjacent two air intake passages.

5. The microbubble-producing water outlet assembly of claim 1, wherein the plurality of water inflow holes in the water inflow component have a funnel-shaped longitudinal section respectively, and the funnel-shaped water inflow holes are arranged in a gradually tapered form in the water outflow direction.

6. The microbubble-producing water outlet assembly of claim 1, wherein the plurality of bubble mesh plates comprise an integrally formed mesh part and assembling part, wherein a plurality of meshes for the water mixed with air to pass through are evenly distributed on the mesh part; and the assembling part is arranged annularly on the circumference of the mesh part, and two adjacent bubble mesh plates abut against or are nested with each other via the assembling part to adjust the spacing between two adjacent bubble mesh plates.

7. The microbubble-producing water outlet assembly of claim 6, wherein the spacing between two adjacent bubble mesh plates is 0.5-2 mm.

8. The microbubble-producing water outlet assembly of claim 6, wherein the meshes of at least two bubble mesh plates are in size of 100-200 meshes per inch (mpi).

9. The microbubble-producing water outlet assembly of claim 8, further comprising a water outflow plate that is mounted in the housing and in communication with the bubble mesh plates; water through-flow passages are evenly distributed on the water outflow plate, and the aperture of the water through-flow passages is greater than the aperture of the meshes of the mesh part.

* * * * *